INVENTORS
JOSEPH F. LOPRETE
SANFORD FLANZENBAUM
JOHN R. CAMPBELL

ATTORNEY

INVENTORS
JOSEPH F. LOPRETE
SANFORD FLANZENBAUM
JOHN R. CAMPBELL

BY

ATTORNEY

INVENTORS
JOSEPH F. LOPRETE
SANFORD FLANZENBAUM
JOHN R. CAMPBELL

BY

ATTORNEY

INVENTORS
JOSEPH F. LOPRETE
SANFORD FLANZENBAUM
JOHN R. CAMPBELL

ATTORNEY

March 19, 1968  J. F. LOPRETE ET AL  3,373,940
VARIABLE AREA EXHAUST NOZZLE

Filed July 12, 1965 5 Sheets-Sheet 5

INVENTORS
JOSEPH F. LOPRETE
SANFORD FLANZENBAUM
JOHN R. CAMPBELL

BY
ATTORNEY

United States Patent Office 3,373,940
Patented Mar. 19, 1968

3,373,940
VARIABLE AREA EXHAUST NOZZLE
Joseph F. Loprete, Wayne, N.J., Sanford Flanzenbaum, New York, N.Y., and John R. Campbell, North Haledon, N.J., assignors to Curtiss-Wright Corporation, a corporation of Delaware
Filed July 12, 1965, Ser. No. 470,986
20 Claims. (Cl. 239—265.15)

ABSTRACT OF THE DISCLOSURE

A variable area exhaust nozzle has, in the throat section thereof, a plurality of accurately shaped segments stacked in a side-by-side relationship around the nozzle axis. The radial inner surface of the segments defines a substantially smooth inner surface portion of the nozzle throughout. Means are provided for moving the segments toward and away from the nozzle axis to vary the cross sectional area of the throat section. As the segments move toward and away from the nozzle axis, alternate segments are movable relative to immediately adjacent segments such that the inner surface of the nozzle section remains substantially smooth.

---

This invention relates to exhaust nozzles for jet engines or the like and is particularly directed to a novel construction for permitting variations in the effective area of the throat portion of the exhaust nozzle.

It is known in the art that the amount of thrust which may be obtained from an exhaust nozzle may be effected by variations in the effective area of the nozzle. For example, when using a variable throat area nozzle with a solid propellant rocket motor it has been found that with a throat area change of 2:1, a substantial thrust range of 25:1 to 50:1, depending on propellant ballistics, can be obtained due to the resulting changes in the burning rate of propellant and the pressure changes. As will become apparent hereinafter, the construction of the variable area exhaust nozzle of the present invention is particularly applicable to reaction motors, such as rocket engines, which operate at substantially high temperatures.

The present invention is generally carried out by providing a plurality of nozzle segments disposed in the region of the nozzle throat which segments can be moved relative to one another through a nozzle and ingenious construction and thereby increase or decrease the cross-sectional area of the nozzle throat area during relative movement thereof. The segments are composed of a high temperature material which has unique anisotropic properties, which will be explained in greater detail below, to conduct heat away from the nozzle throat portion.

Accordingly, it is one object of the invention to provide a novel and improved variable area exhaust nozzle.

It is a further object of the invention to provide a novel throat area construction for an exhaust nozzle.

It is still another object of the invention to provide a novel throat area construction, for an exhaust nozzle whose cross-sectional area may be varied and which novel construction is capable of withstanding high temperature operation.

It is still a further object of the invention to provide a novel and improved variable area construction which is applicable to exhaust nozzles for jet engines or the like for varying the cross-sectional area of the throat portion thereof.

Other objects and advantages of the invention will become apparent upon reading the following detailed description in connection with the accompanying drawings in which.

Figure 1:
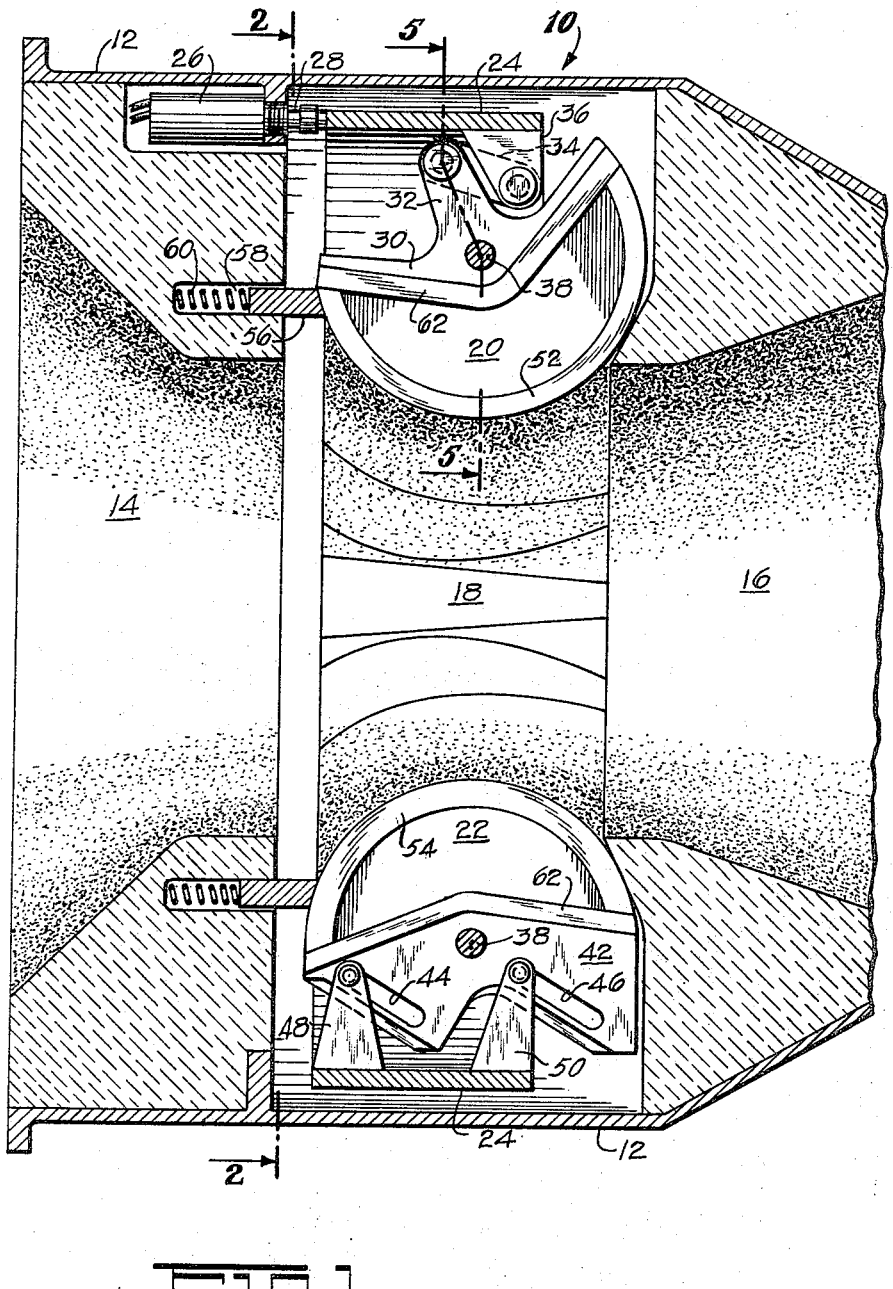
FIG. 1 is an axial sectional view of an exhaust nozzle portion for jet engines or the like taken along line 1—1 of FIG. 2.

Referring to the drawings, an exhaust nozzle is illustrated at 10 comprises an outer housing 12 containing therein a convergent nozzle portion 14 whose profile is defined by a suitable heat resistant material such as a high-temperature plastic, pyrolytic graphite or the like, a divergent nozzle portion 16 having a similar material defining said portion 16 as the portion 14, and a throat portion 18 whose construction will be defined in greater detail below. Although the nozzle 10 illustrated herein is shown as an exhaust nozzle for rocket engines, it should be understood that the concept including the variable area throat portion of the invention is equally applicable to variable area throat portions for exhaust nozzles in jet engines or the like.

The throat portion 18 is comprised of a first group of semicircular wedge-shaped segments 20 which may be termed rotatable segments and a second group of semicircular wedge-shaped segments 22 which may be termed radially movable segments. The segments 20 and 22 are disposed in side-by-side alternating arrangement around the axis of a nozzle 10 with their radially inner peripheries defining the cross-sectional area of the throat portion 18 at least in the region of minimum cross-sectional area. As will be more specifically explained hereinafter, each of the segments 20 and 22 is supported by a cylindrical support member 24 which is disposed in concentric relationship with the outer housing 12 of the nozzle 10 and holds the segments 20 and 22 in stacked side-by-side relationship.

Figure 2:
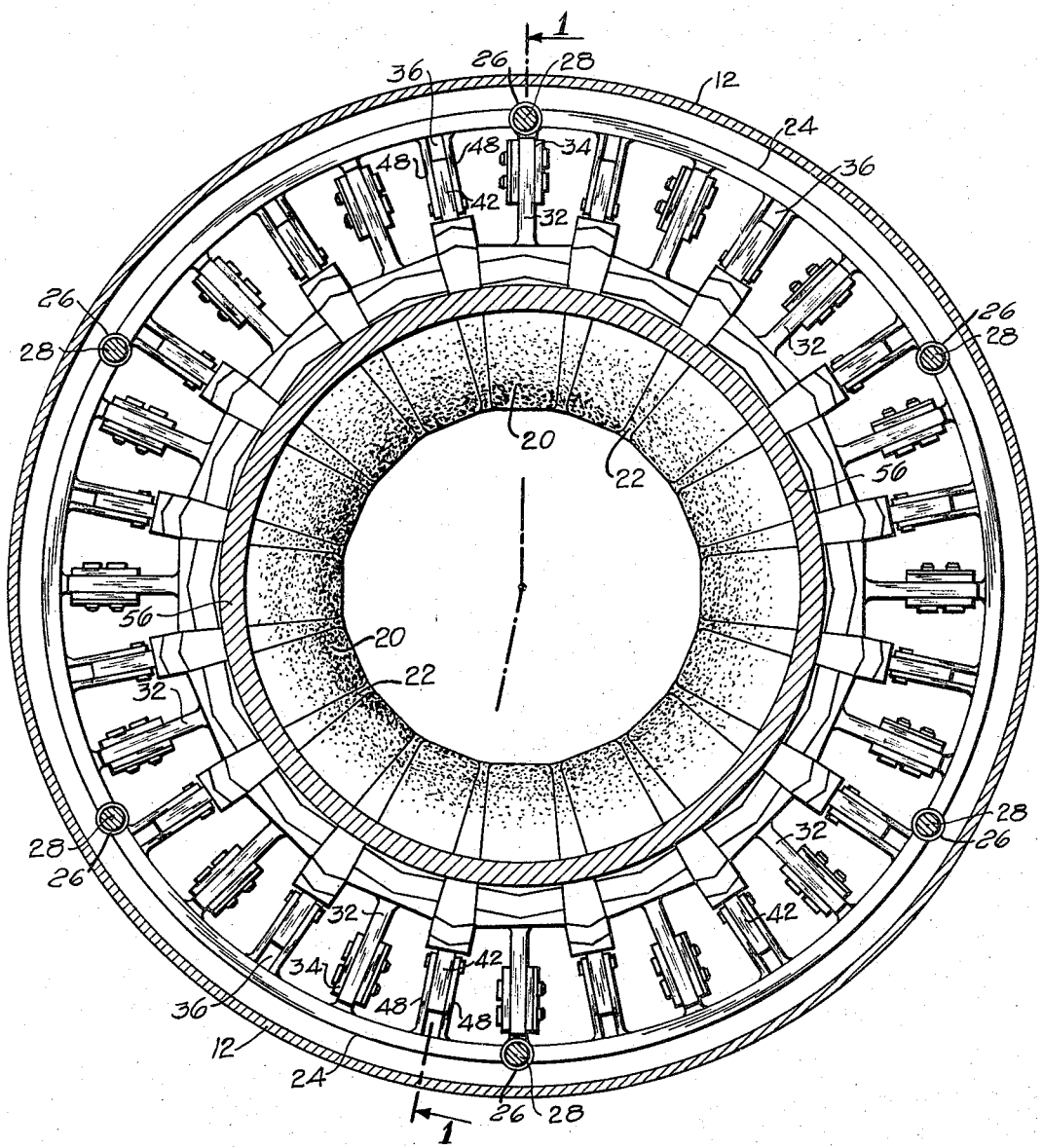
FIG. 2 is a sectional view taken along line 2—2 of FIG. 1.
Figure 4:
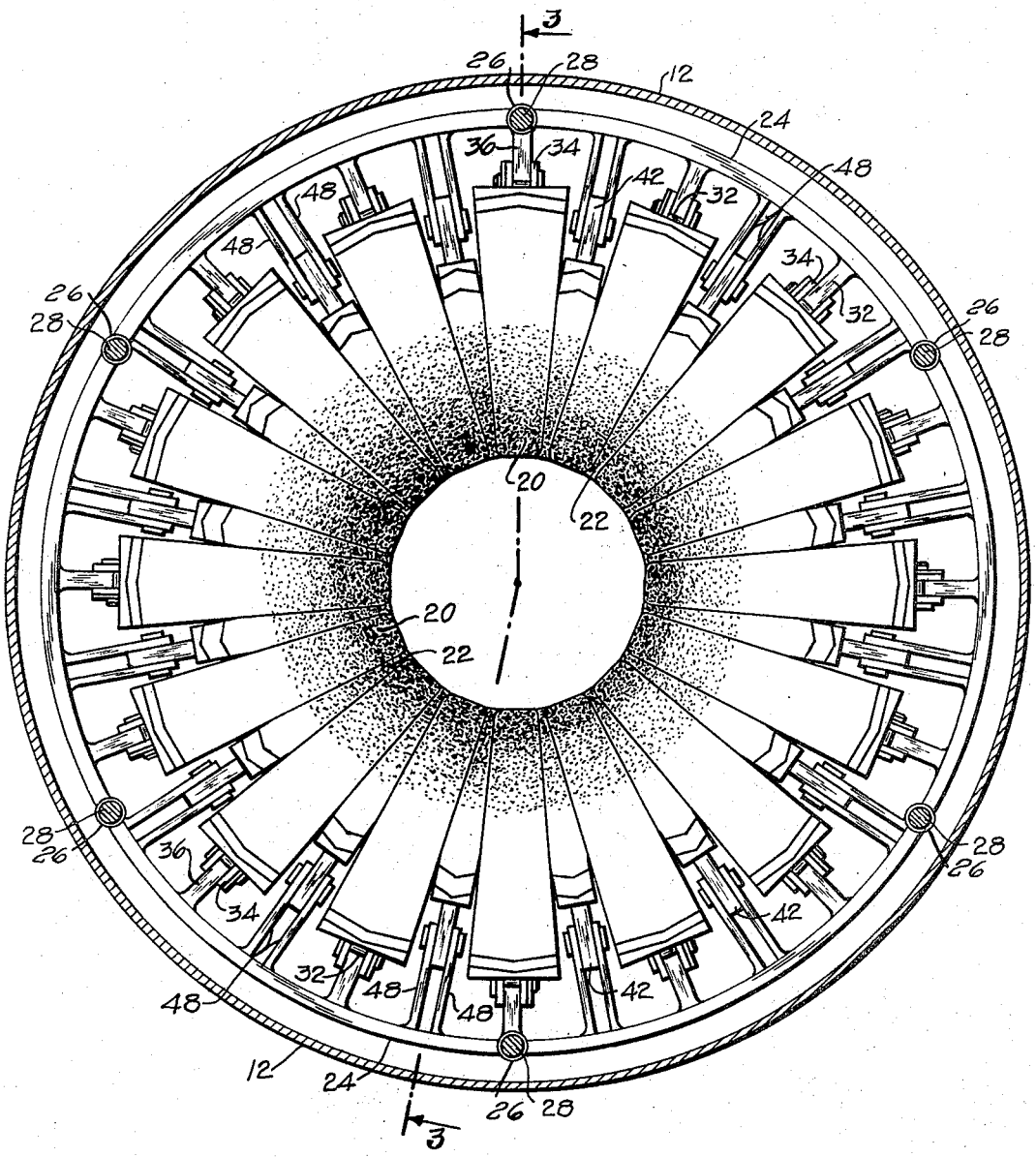
FIG. 4 is a sectional view taken along line 4—4 of FIG. 3.

The cylindrical member 24 is connected to a plurality of valve members 26, six such valve members being illustrated in the drawings in FIGS. 2 and 4. The valves 26 may be solenoid-type valves or hydraulically actuated type valves which may operate in incremental steps or with a continuously variable or modulating method of actuation. The valves 26 each has a shaft 28 extending therefrom which is suitably connected to the cylindrical member 24 and when the valve is actuated, the shaft 28 will be pushed out a desired length to move the cylindrical member 24 either forwardly or rearwardly depending upon the actuation of the valve member 26. The valve members 26 are controlled by a suitable electronic system or hydraulic system, not shown, and no invention is alleged in the valve actuation system in itself and any system known in the art may be used.

Figure 5:
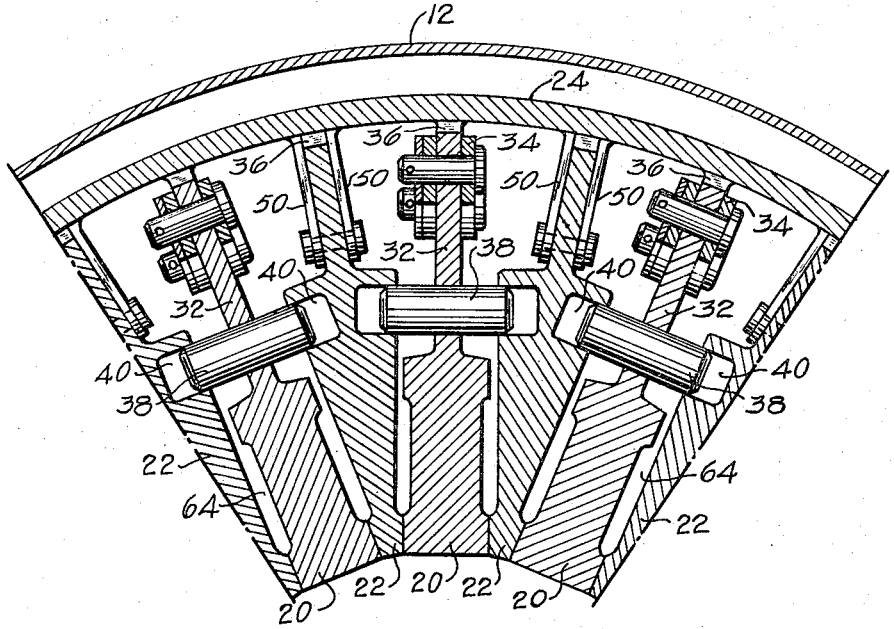
FIG. 5 is a partial sectional view taken along line 5—5 of FIG. 1.

The rotatable segments 20 are connected to the cylindrical member 24 in the following manner. Each of the segments 20 is provided with a support member 30 having a radially extending arm 32 thereon. A link member 34 is pivotally connected to the arm 32, as illustrated, at one end thereof and pivotally connected to a lug 36 on the cylindrical member 24 at the other end thereof as illustrated. A pivot pin 38 is provided through a hole in the support member 30 at the radially inner portion thereof which pivot pin 38 rests in grooves 40 in each of the adjacent radially movable segments 22 (FIG. 5). Thus, the segments 20 may rotate about the pivot pin 38 which pivot pin is supported in the grooves 40 of the segments 22. It will be apparent when the valve member 26 is actuated to move the cylindrical member 24 toward the discharge end of the nozzle that the link member 34 will be moved rearwardly to pull the radially extending arm 32 of the support member 30 in a rearward direction to cause the segment 20 to pivot around the axis of the pivot pin 38.

The radially movable segments 22 have a support member designated at 42 with said support member being provided with cam slots 44 and 46 on the radially outward side thereof. The cylindrical member 24 is provided with lug members 48 and 50 adjacent each of the cam slots 44 and 46 on the support member 42 for the segments 22 which lugs 48 and 50 respectively ride in said cam slots 44 and 46 through a pin connection, as illustrated. Thus it will be seen that, when the valve member 26 is actuated, the shaft 28 will move the cylindrical member rearwardly and the lugs riding in the cam slots 44 and 46 will raise or move the segments 22 in a substantially radially inward direction towards the nozzle axis. It should be understood, however, that a linkage system or other similar type mechanism may be used in lieu of the lugs 48, 50 and cam slots 44, 46.

As will also be seen, the movement of the segments 22 will not be purely in a radially inward direction but said segments 22 will also move slightly in an axially forward direction due to the movement of the lugs 48 and 50 on the cam surfaces 44 and 46. Thus, the pivot pins 38 carried by the groove portions 40 of the segments 22 will also be moved radially inwardly and forwardly with the segments 22 so that the rotatably supported segments 20 will not only pivot about the axis of the pivot pin 38 but the pivot pin axis will also move in a radially inward and forward direction. Thus, the movement of the segments 20 is not purely a rotatable movement but also a slight radially inward and forward movement. However, for purposes of description, the movement of the segments 20 will hereinafter be referred to as rotatable. In order to open the nozzle from the closed condition the operation is simply reversed from that described above.

Figure 6:
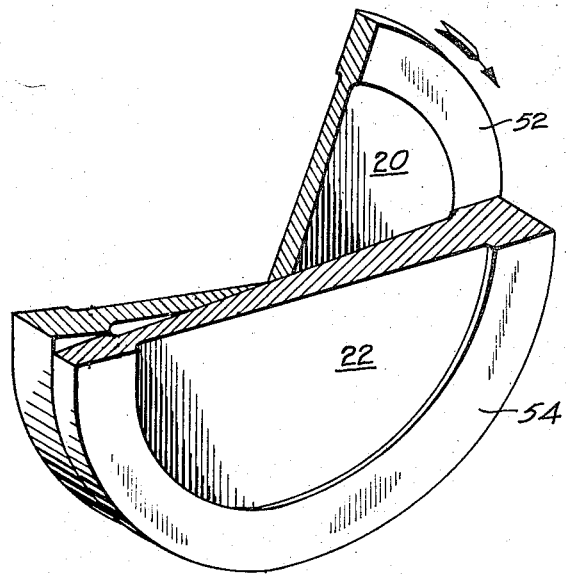
FIG. 6 is an enlarged perspective view showing some of the elements used in the throat portion of the variable area exhaust nozzle of the invention.

Referring now to FIG. 6, it will be seen that each of the segments 20 and 22 has a definite wedge-shape in the axial direction with the narrower portion of the segments 20 and 22 being disposed opposite from one another with respect to the axis of the nozzle 10. It will further be seen that each of the segments is provided with a land portion 52 on the segments 20 and 54 on the segments 22 with said land portions being disposed at the radially inwardmost portion of the segments to provide a gas-tight seal for the inner surface of the nozzle throat portion 18 when the segments are disposed in side-by-side relationship. The surfaces 52 and 54 of the segments 20 and 22, respectively, are each helical surfaces which are disposed relative to their adjacent segment so that the rotatable segments 20 may rotate relative to the segments 22 without losing surface contact between their respective surfaces 52 and 54. In other words, the relative movement between the segment 20 and 22 is similar to that of a screw thread.

Figure 3:
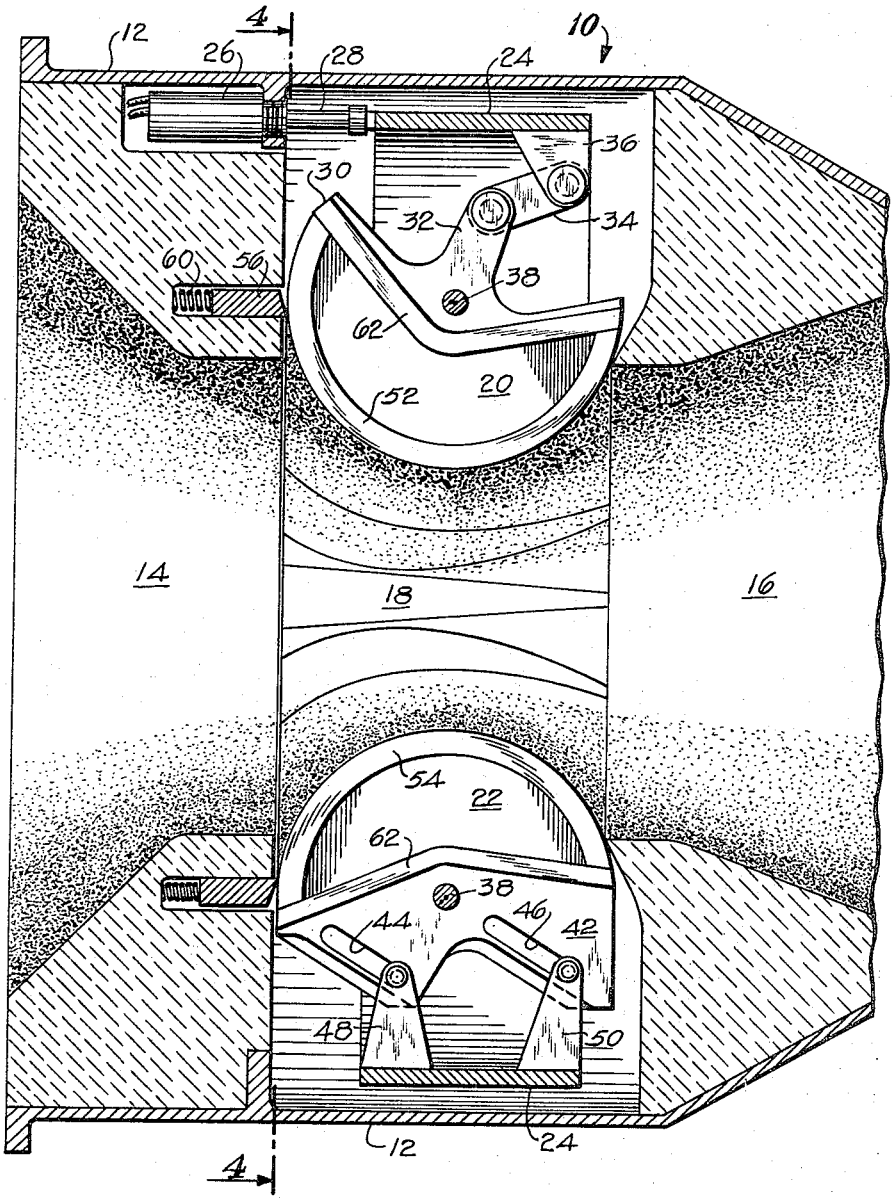
FIG. 3 is a sectional view similar to that shown in FIG. 1 taken along line 3—3 of FIG. 4 and showing the exhaust nozzle throat area in a different position from that shown in FIG. 1.

FIG. 1 illustrates the variable area portion of the rocket nozzle 10 having its largest cross-sectional area. When the valve members 26 are actuated to move the cylindrical supporting member in an actually rearward direction towards the discharge end of the nozzle, as shown in FIG. 3, the rotatable segments will be swung around their pivot pin axis and moved slightly in a forward or upstream direction wherein the radially inner peripheral surface of the segments 20 will move radially inwardly toward the nozzle axis. At the same time as the rotatable segments 20 rotate and thereby moving a different thickness thereof relative to the segments 22, the segments 22 will be moved radially inwardly and in a slightly forward direction toward the nozzle axis to take up the space formed by the rotation of the segments 20 with the helical surfaces 52 and 54 maintaining contact between the segments during the relative movement. Thus, referring to FIGS. 3 and 4, it will be seen that the cross-sectional area of the nozzle throat portion is substantially smaller than that shown in FIGS. 1 and 2. An annular seal member 56 is provided at the upstream end of the throat portion 18 and is disposed in sealing engagement with the radially inner periphery of the segments 20 and 22 to maintain a gas-tight relationship at the upstream end of the throat portion 18 during movement of the segments toward and away from the nozzle axis. The seal member 56 is supported in a groove 58 in the upstream nozzle portion 14, as illustrated, and is biased in an axially rearward or downstream direction by a spring 60. As shown in FIGS. 1 and 3, when the segments move in an upstream or downstream relative direction, the seal member 56 will move in and out to maintain sealing contact with the segments 20 and 22 in order to prevent loss of gases at the upstream end of the throat portion of the nozzle.

The nozzle 10 of the invention, as described above, is preferably used with solid propellant rocket motors. However, it should be understood that the invention is not limited to use with solid propellant rocket motors. It has been found that, when using a throat area change having a ratio of 1.87 to 1 with solid propellant fuel having a ratio of burning rate to chamber pressure value of 0.85, changes in thrust level of 37 to 1 may be obtained. It has also been found, that by varying the thickness of the wedges, greater throat area changes can be obtained for a given contact length between the wedges and a given angle of rotation of said wedges. Increasing the angle of rotation, or decreasing the contact length further provides additional increases in throat area change. Therefore, it will be apparent that substantial changes in throat area can be obtained through minor variations in the construction illustrated in the drawings.

It will be seen from the above description thus far that the construction of the variable area nozzle provides a simple means of selectively varying the thrust of a solid propellant rocket without requiring complications in the solid propellant drain design. As briefly explained above, the nozzle of the invention has application for operation under extreme high temperature conditions such as in excess of 6000° F.

The capabilities of the nozzle construction of the invention can be substnatially increased insofar as high temperature operation is concerned, by making use of the relatively unique properties of pyrolytic graphite. As is known, pyrolytic graphite is a material which has definite anisotropic characteristics. The pyrolytic graphite is obtained in a furnace by vapor deposition from carbon bearing vapor. The wedges 20 and 22 of the invention may be formed by depositing pyrolytic graphite on a flat surface, the graphite being deposited on said surface to form a sufficient thickness for obtaining the desired size wedges to be used in the nozzle 10. In direction parallel to the plane of deposit, the pyrolytic graphite has excellent heat conduction properties, while in a direction perpendicular to said plane of deposit, the pyrolytic graphite is an excellent heat insulator. Thus, with references to the drawings, it will be seen that, in directions parallel to the nozzle axis and in the radial direction relative to the nozzle axis, there will be good heat conduction, while in a direction substantially perpendicular to the median plane of the wedges, there will be little heat conduction, or in other words, in the circumferential direction relative to the nozzle axis. Thus, the nozzle 10 will have high heat conduction in directions axially along the axis of the nozzle and radially therefrom, while in the circumferential direction with respect to said axis, the nozzle will have high heat insulating properties with little heat conduction occurring around the nozzle axis in the circumferential direction. It will therefore be apparent that heat will be conducted rapidly away from the radially inner surface of the nozzle throat portion, which throat portion is the region of substantially highest temperature operation of the nozzle. Heat saturation of the nozzle throat area is therefore delayed by allowing heat to flow into portions of the nozzle which are relatively cool resulting in an elimination of the problem of erosion of the nozzle throat area which is a major problem causing decomposition of nozzle throats in many exhaust nozzles in use today. Referring to FIGS. 1 and 3, a layer of pyrolytic graphite 62 is also provided on the radially outward side of each of the segments 20 and 22 and is securely bonded between its segment 20 or 22 and the respective support member 30 or 42. The pyrolytic graphite layer 62 is oriented so that it is relatively highly thermally non-conductive in the radial direction so that said layer 62 acts as an insulating layer for its respective segment 20 or 22.

Pyrolytic graphite is further characterized by the fact that in the directions of high heat insulation there is also a relatively high rate of thermal expansion. Referring to the structure shown in FIG. 5, it will be seen that radially outwardly of the land portions 52 and 54 on the wedges 20 and 22, respectively, each of the segments 20 and 22 is cut back in its side face to provide gaps 64 therebetween. This undercut structure in each of the side faces of the segments 20 and 22 compensates for the relatively high thermal expansion in the circumferential direction so that the segments 20 and 22 may expand in this direction without causing a separation at the radially inner surface thereof which might result in gas leakage between adjacent segments 20 and 22.

It will be apparent from the above-detailed description that a novel and improved variable area nozzle is provided which is capable of high temperature operation. It will be further apparent that substantial ranges of thrust can be provided by varying the throat area of the nozzle through the novel construction of the invention, which variation in area causes changes in the burning rate and pressure of the propellants. Although the nozzle of the invention has been described in relation to rocket motors in particularly solid propellant rocket motors, it will be obvious that the nozzle can be utilized with other types of engines such as jet engines, turbojets and other similar type power plants.

While we have described our invention in detail in the above description, it will be apparent to those skilled in the art that various modifications and changes may be made without departing from the spirit and scope of the invention as defined in the appending claims.

We claim:

1. A variable area exhaust nozzle for jet engines or the like, said nozzle having convergent and divergent sections connected by an annular throat section; a plurality of arcuately shaped segments stacked in side-by-side relationship around the nozzle axis forming a portion of said nozzle throat section with the radially inner surface of said segments defining a substantially smooth inner surface for said portion of said nozzle throat section; means for moving each of said segments toward and away from the nozzle axis for varying the cross-sectional area of said throat section, and alternate numbers of said segments being movable relative to their immediately adjacent segments during movement of each of said segments toward and away from the nozzle axis with the relative movement of said alternate numbers of said segments being such that the inner surface of said portion of said nozzle throat section remains substantially smooth during movement of said segments toward and away from said nozzle axis.

2. A variable area exhaust nozzle as recited in claim 1 wherein each segment is composed of an anisotropic material with said segments being oriented so that the material of said segments is relatively highly thermally conductive in the radial and axial directions with respect to the nozzle axis and relatively highly thermally non-conductive in the circumferential direction with respect to said nozzle axis.

3. A variable area exhaust nozzle as recited in claim 2 wherein the material of each said segment comprises pyrolytic graphite.

4. A variable area exhaust nozzle as recited in claim 3 wherein each segment has a layer of relatively highly thermally non-conductive material on its radially outer surface with respect to said nozzle axis for limiting heat conduction radially outwardly beyond the radially outer surface of said segments.

5. A variable area exhaust nozzle as recited in claim 4 wherein said layer comprises pyrolytic graphite with said pyrolytic graphite being oriented with respect to the nozzle axis so that said layer is relatively highly thermally non-conductive in the radial direction.

6. A variable area exhaust nozzle as recited in claim 1 wherein the thickness of each segment varies from its upstream side to its downstream side with alternate segments having their maximum thickness side facing an opposite direction from their immediately adjacent segments so that adjacent segments may move relatively to one another during movement toward and away from the nozzle axis.

7. A variable area exhaust nozzle as recited in claim 6 wherein said alternate numbers of said segments are rotatable relative to the immediately adajacent segments such that movement of all of said segments will be substantially unrestricted for varying the cross-sectional area of said throat section.

8. A variable area exhaust nozzle as recited in claim 7 wherein each side face of each of said segments comprises a helically shaped surface with the facing helically shaped surfaces of adjacent segments being disposed so that the side faces of said segments will remain in contact during relative movement between said segments for varying the nozzle throat area.

9. A variable area exhaust nozzle as recited in claim 8 wherein the radially inner portion of each side face of each of said segments has a land portion formed thereon with each said land portion of each of said segments being disposed in abutting engagement with a land portion of an adjacent segment so that during relative movement between said segments a substantially gas-tight relationship will be maintained between said movable segments.

10. A variable area exhaust nozzle as recited in claim 1 further comprising seal means disposed in sealing engagement between said movable segments and the immediately adjacent upstream and downstream portion of said exhaust nozzle for preventing leakage of exhaust gases therebetween during movement of said segments.

11. A variable area exhaust nozzle for jet engines or the like wherein said nozzle has convergent and divergent sections interconnected by a nozzle throat section; a plurality of substantially semi-circular segments disposed circumferentially around the nozzle axis in side-by-side relationship with the radially inner surface of said segments forming at least a portion of the nozzle throat section, said segments each being tapered along their length relative to the axis of said nozzle with adjacent segments being tapered in opposite directions for permitting relative movement between said segments, means for moving each of said segments between a first position wherein the cross-sectional area of said throat section is a maximum and a second position wherein the cross-sectional area of said throat section is a minimum.

12. A variable area exhaust nozzle for jet engines or the like wherein said nozzle has convergent and divergent sections interconnected by a throat section, a plurality of substantially semi-circular segments disposed circumferentially around the nozzle axis in side-by-side relationship with the radially inner surface of said segments forming at least a portion of the nozzle throat section, means for moving each of said sections between a first position wherein the cross-sectional area of said throat section is a maximum and a second position wherein the cross-sectional area of said throat section is a minimum with alternate segments also being movable relative to the remainder of said segments for permitting substantially unrestricted movement of said segments between said maximum and minimum throat area positions.

13. A variable area exhaust nozzle for jet engines or the like, said nozzle having convergent and divergent sections connected by an annular throat section; a first group of substantially semi-circular wedge-shaped segments disposed around the nozzle axis with the thickness of each segment varying from its upstream side to its downstream side; a second group of substantially semi-circular wedge-shaped segments disposed around a nozzle axis and in alternating side-by-side relationship with the segments of said first group, the thickness of each segment of said second group also varying from its upstream side to its downstream side but opposite to the segments of said first group, the segments of said first and second groups forming at least a portion of said nozzle throat section, and means for moving each said group of segments radially relative to the nozzle axis for varying the cross-sectional area of said portion of said nozzle throat section, said second group of segments also being rotatable relative to said first group of segments such that during movement of said first and second groups of segments toward and away from said nozzle axis, said second group of segments may rotate to permit substantially unrestricted movement of said first and second groups of segments for varying the cross-sectional area of said portion of said nozzle throat section while maintaining a substantially smooth inner surface for said portion of said nozzle throat section.

14. A variable area exhaust nozzle for jet engines or the like, said nozzle having convergent and divergent sections interconnected by a throat section; a plurality of wedge-shaped segments stacked in side-by-side relationship around the nozzle axis and forming at least a portion of the nozzle throat section, said stacked wedge-shaped segments including first and second groups of said segments with the wedge-shaped segments of said first group being oriented oppositely with respect to the wedge-shaped segments of said second group; means for moving both said groups toward and away from the nozzle axis for varying the cross-sectional area of said throat section with said first and second groups also being movable relative to one another; and means interconnecting said first group of segments with said second group such that, during movement of one of said groups toward and away from said nozzle axis, the other of said groups is moved by said means interconnecting said groups toward and away from said nozzle axis with said one of said groups.

15. A variable area exhaust nozzle as recited in claim 14 wherein said means interconnecting said first group of segments with said second group comprises a pin member carried by each of said segments of said first group and immediately adjacent segments of said second group disposed on each side of each said segment of said first group.

16. A variable area exhaust nozzle as recited in claim 15 wherein said segments of said first group are rotatable about said pin member relative to the segments of said second group.

17. A variable area exhaust nozzle as recited in claim 16 wherein said first and second groups of segments are supported by an annular support means with said support means including means for initiating movement of at least one of said groups of segments toward and away from said nozzle axis.

18. A variable area exhaust nozzle as recited in claim 17 wherein said annular support means further includes means for initiating relative rotational movement of said first group of segments.

19. A variable area exhaust nozzle as recited in claim 14 wherein each of said segments is substantially composed of an anisotropic material with said anisotropic material being oriented such that said segments are relatively highly thermally conductive in the axial and radial directions relative to the nozzle axis.

20. A variable area exhaust nozzle as recited in claim 19 wherein each of said segments is further provided with a layer of an anisotropic material on the radially outward side thereof which layer is oriented such that said layer is relatively highly thermally non-conductive in the radial direction relative to the nozzle axis whereby said layer acts an an insulating layer on the radially outward side of its associated segment.

References Cited
UNITED STATES PATENTS

| | | | |
|---|---|---|---|
| 2,811,015 | 11/1957 | Vegrer | 239—265.15 |
| 3,005,308 | 10/1961 | Bader | 60—35.6 |
| 3,192,709 | 7/1965 | Hardy | 239—265.19 |
| 3,224,193 | 12/1965 | Loperte et al. | 239—265.15 |

EVERETT W. KIRBY, *Primary Examiner.*